United States Patent

[11] 3,628,212

[72] Inventor Russel A. Van Brakel
 Wood Dale, Ill.
[21] Appl. No. 851,539
[22] Filed Aug. 20, 1969
[45] Patented Dec. 21, 1971
[73] Assignee Haverberg Auto Laundry Equipment Co., Inc.
 Chicago, Ill.

[54] WHEEL WASHER ASSEMBLY
 4 Claims, 5 Drawing Figs.
[52] U.S. Cl. .................................................. 15/21 B
[51] Int. Cl. .................................................. B60s 3/04
[50] Field of Search ....................................... 15/DIG. 2, 21 R, 21 B, 21 C, 97, 302

[56] References Cited
 UNITED STATES PATENTS
2,692,214 10/1954 Hurst ............................ 15/21 E
2,814,825 12/1957 Guthrie, Jr. et al. ........... 15/21 B
2,837,759 6/1958 Haverberg ..................... 15/21 B Primary Examiner—Edward L. Roberts
Attorney—Seed, Berry & Dowrey ABSTRACT: A conveyor moves a vehicle along a path through a wheel washer. A wheel of the vehicle is rotated as it is moved along the path. A lower brush, stationary in respect to the direction of the path, and an upper movable brush having elongated flexible bristles are moved into engagement with the wheel with the lower brush engaging the tire and the upper brush engaging the hub cap. The upper brush carries a spray nozzle and is moved in synchronism with the wheel by a sensing device that is engaged by the wheel. In one form the upper brush is stepped to engage the center of the hub cap and its inset edge.

PATENTED DEC 21 1971 3,628,212

INVENTOR.
RUSSEL A. VAN BRAKEL
BY
*Sold, Berry & Dowrey*
ATTORNEYS

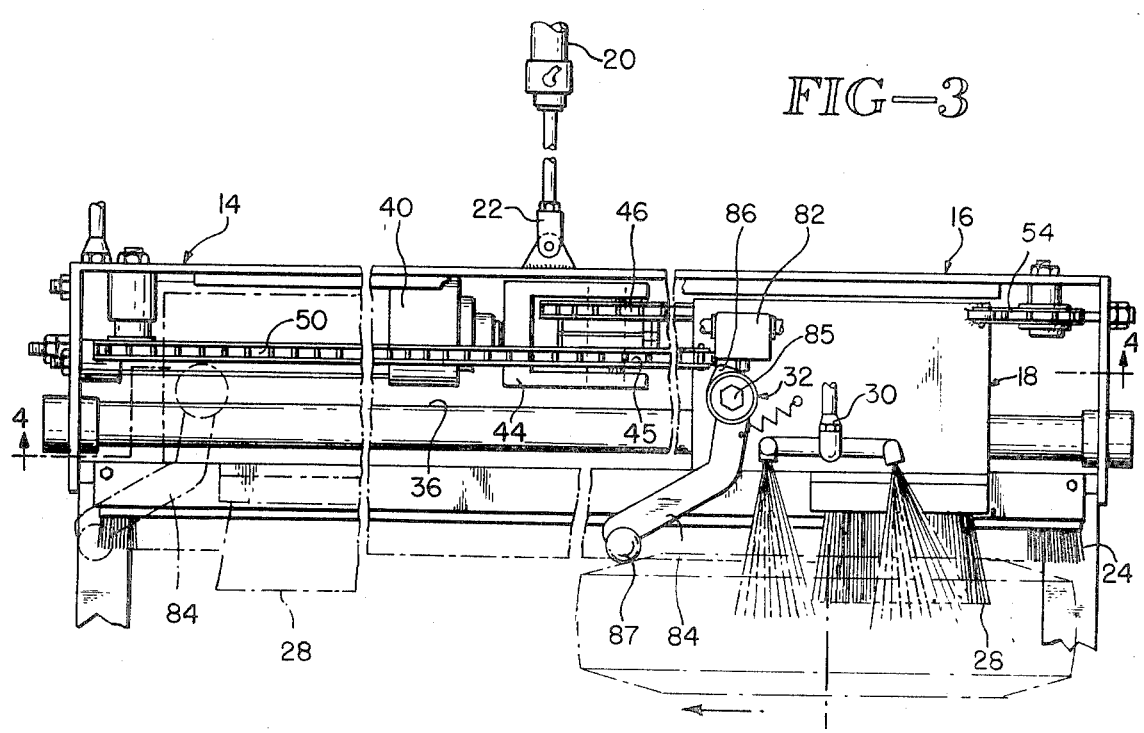

WHEEL WASHER ASSEMBLY

BACKGROUND OF THE INVENTION

1. Field of the Invention

This invention pertains to automated car washers and, more particularly, to apparatus for washing the wheels in such car washers.

2. Description of the Prior Art

Automated devices have been employed in the past for washing the tires of a vehicle wheel; however, there has never been a satisfactory washer for simultaneously washing both the tire and the hub cap of the wheel. Typical of these prior devices are shown in U.S. Pats. Nos. 3,058,133 and 3,191,207.

SUMMARY OF THE INVENTION

This invention pertains to an automated wheel washer capable of washing both the tire and the hub cap. Basically the invention comprises a wheel washer assembly which employs a conveyor for moving a vehicle along a predetermined path, means for rotating a wheel of the vehicle, a first brush engageable with the tire of the wheel and a second brush engageable with the hub cap of the wheel. Preferably the brush engaging the hub cap moves along the path synchronously with the wheel in response to a sensing device that senses the position of the wheel. With such an assembly both the tire and the hub cap are cleaned effectively without the need for a separate manual cleaning of the hub cap. The hub cap brush is provided with flexible, elongated bristles, in one form stepped, that conform to the curvature of the hub cap.

BRIEF DESCRIPTION OF THE DRAWINGS

FIG. 3 is a plan of a portion of the assembly shown in FIG. 1.

FIG. 4 is a vertical section taken along the line 4—4 of FIG. 3.

FIG. 5 is a fragmentary plan of a stepped form of brush usable with the wheel washer assembly of FIG. 1.

DESCRIPTION OF THE PREFERRED EMBODIMENTS

Figure 1:
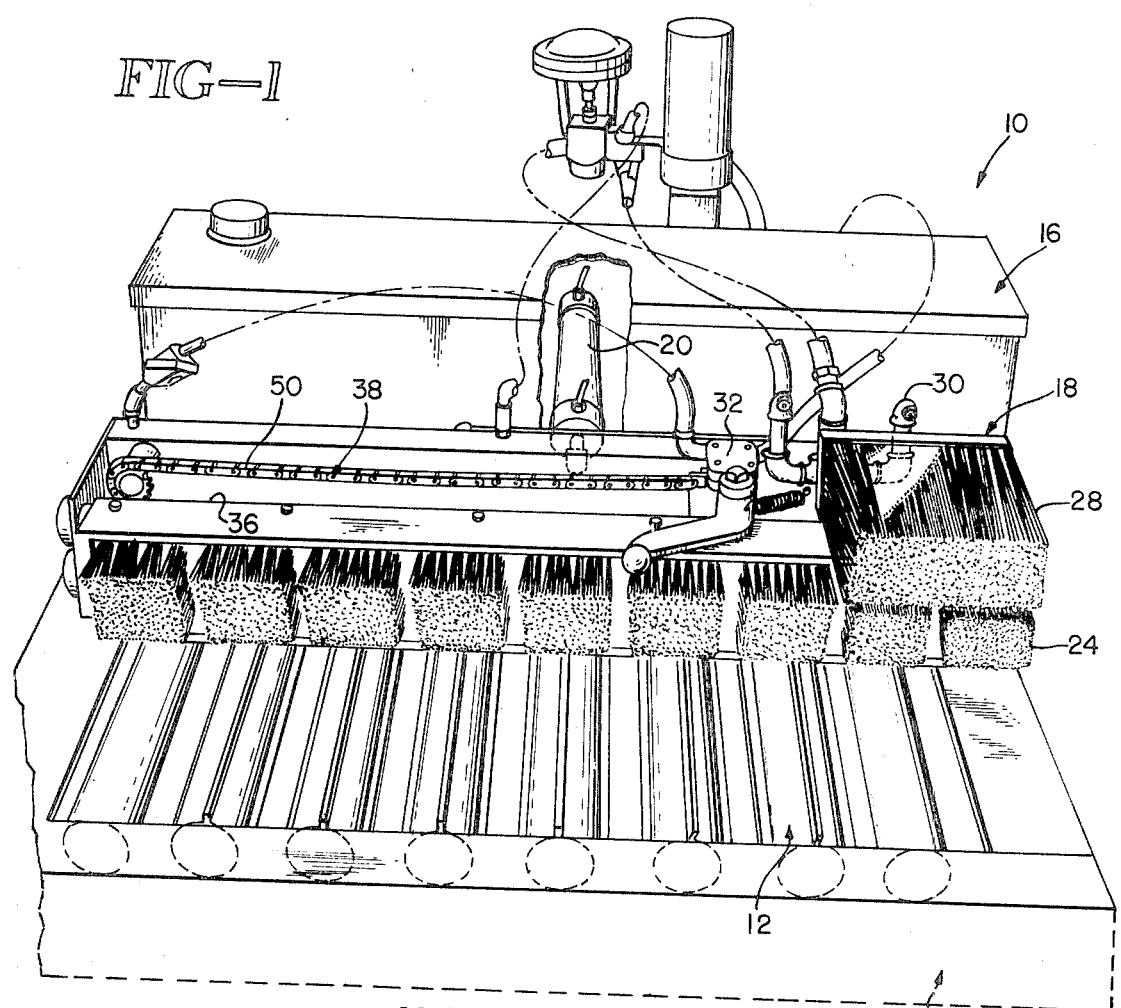
FIG. 1 is a perspective of a wheel washer assembly embodying the principles of the invention.

As is well known the wheel washer assembly 10 is incorporated into an automated vehicle washing system in which cars are moved along a path by a conveyor with various washing and drying operations taking place at different stations along the path. In actual practice, two wheel washer assemblies are used one on each side of the conveyor. Since both wheel washer assemblies are identical, however, only a single assembly will be described in this application.

The wheel washer of the present invention relies upon the spinning of the wheel while in contact with the brush to obtain a scrubbing action. As is well known in the art this spinning is accomplished by pulling the vehicle over a set of powered rollers 12. The rollers are activated by a treadle mounted at the upstream end of the wheel washer assembly and are deactivated by a treadle at the downstream end of the wheel washer assembly. The brushes are moved into engagement with the wheel while the wheel is being sprayed with a cleaning solution, steam or both. Additional details of the overall wheel-washing system may be found in the aforementioned patents.

In general, the illustrated embodiment of the present invention comprises a stationary frame 14, a carriage 16 movable for reciprocation toward and away from the vehicle path of travel, and a brush holder assembly 18 mounted for reciprocable movement along the vehicle path of travel. The carriage 16 is reciprocated by a pneumatic piston 20 having a piston rod 22 pivotally secured to the carriage. Extension of the piston rod 22 moves the carriage toward the path of the vehicle whereas retraction of the piston rod pulls the carriage away from the path of the vehicle.

Fixed on a lower portion of the carriage 16 is a series of stationary, relative to the direction of the vehicle path of travel, stiff-bristled brushes 24 which are positioned to engage the tire mounted on the wheel of the vehicle. Thus, as the vehicle is moved along over the rollers 12 the wheel will spin and rub against the brushes 24 along the entire length of the wheel washer assembly.

The brush holder 18 includes a brush 28 having long flexible bristles which will conform to the curvature of a hub cap and will penetrate into the indentations of the hub cap for effective cleaning. Also mounted on the brush holder assembly 18 is a set of nozzles 30 which as is well known direct a high-pressure spray of hot soapy water, steam, or other suitable cleaning solution onto the wheel as it is being moved through the wheel washer assembly. Preferably one nozzle is directed at the center of the wheel whereas the other is directed at the sidewall of the tire. Wheel position sensing means are provided on the carriage 18 and are engaged by the tire of the wheel to control the operation of the wheel washer assembly in a manner to be described. The brush holder assembly 18 moves in a track 36 and is positioned by a chain and sprocket mechanism 38. The chain and sprocket mechanism includes a pneumatic cylinder 40 having a piston rod 42 that has a clevis 44 secured to its outer end. A pair of spaced inner and outer sprockets 45 and 46, respectively, are rotatably mounted on the clevis. An inner chain 50 is secured at one end to a vertical wall of the carriage 16. The chain is entrained about the inner sprocket 45, an inner idler sprocket 52, and is fixed at its opposite end to the downstream end of the brush holder assembly 18. An outer chain 54 is fixed at one end to the upstream end of the carriage 16. The chain is entrained around the outer sprocket 46, an outer idler sprocket 56, and is secured at its other end to the upstream end of the brush holder assembly 18. As is readily apparent from FIG. 4 extension of the piston rod 42 causes the inner and outer sprockets to rotate in a counterclockwise direction pulling the brush holder assembly 18 downstream or to the left as viewed in FIG. 4. Retraction of the piston rod 42 will return the brush holder assembly 18 to its upstream position as shown in FIG. 4.

Figure 2:
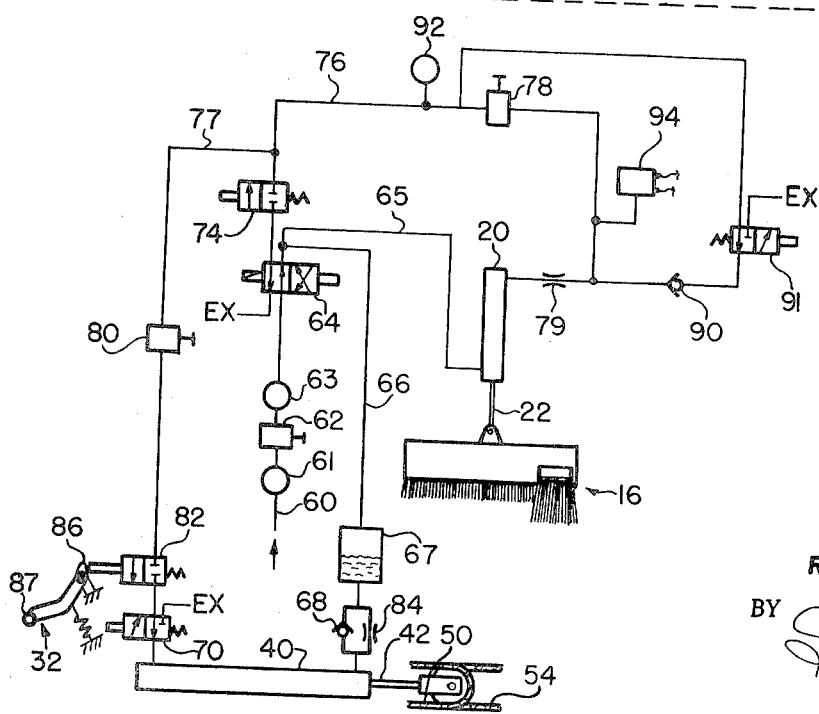
FIG. 2 is a pneumatic diagram used to control the operation of the wheel washer assembly shown in FIG. 1.

Control of the operation of the wheel washer assembly is best illustrated by the pneumatic diagram shown in FIG. 2. Pressurized air is provided from a suitable supply and passes through a line 60, filter 61 an air regulator valve 62, preferably capable of maintaining about 80 lbs. pressure in the line, a conventional air oiler 63, to a conventional four-way, treadle-actuated valve 64. The treadles at the entrance and exit of the wheel washer are electrically connected to solenoids on the valve to position it in one of the two positions. When the vehicle depresses the treadle at the downstream or exit end of the wheel washer assembly, indicating that the wheel is leaving the wheel washer assembly, the valve 64 is shifted to the right as shown in FIG. 2 directing the pressurized air through a line 65 to the rod end of the cylinder 20 thus retracting the piston rod 22 and the carriage 16. Air is exhausted from the head end of the cylinder 20 through a flow control valve 79, a check valve 90 and a solenoid-operated exhaust valve 91 which is moved to the left upon depression of the downstream treadle. The pressurized air is also passed through a line 66 to an oil reservoir 67 thus pressurizing the tip of the reservoir to force oil reservoir 67 thus pressurizing the top of the reservoir to force oil through a check valve 68 into the rod end of the cylinder 40. The downstream treadle also energizes a solenoid on an exhaust valve 70 which is connected to the head end of the cylinder 40 opening the exhaust valve to the exhaust position or to the right, as shown in FIG. 2, to exhaust the air trapped behind the piston in the head end of the cylinder. Thus as the oil is forced into the rod end of the cylinder the piston rod is retracted shifting the brush holder assembly 18 to the upstream end of the wheel washer assembly 10.

The circuit is energized to commence a washing operating when a vehicle wheel depresses an upstream treadle which shifts the valve 64 to the left. At this time the pressurized air from line 60 is passed through a solenoid-operated safety valve 74 which is spring-baised into the closed position as shown in FIG. 2. The valve 74 is opened by the vehicle as it contacts a conventional wand (not shown) disposed in the path of the vehicle as it is moved along by the conveyor. The purpose of the valve 74 is to assure that the wheel washer assembly is not accidentally operated without a vehicle being present. The pressurized fluid is passed through the safety valve 74 into lines 76 and 77. Air in the line 76 passes through an air regulator valve 78, which maintains the pressure at about 35 lbs., then through a flow control valve 79 into the head end of the cylinder 20 thus extending the piston rod 22 and moving the carriage 16 toward the vehicle. Brushes 24 and 28 will contact the wheel when the carriage 16 is fully extended. Air in the rod end of the cylinder 20 is exhausted through line 65 and valve 64. Air in line 76 also energizes conventional air-actuated steam control valve 92 to direct the washing solution to the nozzles 30 and conventional air-actuated motor control valve 94 to energize the motor for rotating the set of rollers 12. Pressurized air in the line 77 passes through an air regulator valve 80, which maintains the pressure at about 80 lbs., and then to a cam-actuated valve 82 that is normally biased to the blocked position or to the left as shown in FIG. 2. Movement of the valve to the right will permit passage of the air in line 77 through the exhaust valve 70 into the head end of the cylinder 40 thus extending the piston rod 42. Since the rod end of the cylinder is filled with oil from the reservoir 67 the piston rod is extended more slowly and more smoothly than it is retracted. The oil is fed into the reservoir through a flow control valve 84 to further assure a smooth operation. The air in the top of the reservoir 67 is exhausted through line 66 and valve 64.

The valve 82 is actuated by the wheel position sensing means 32 which includes an arm 84 pivoted at one end on a post 85. A cam 86 extends from the post 85 and is rotated with the arm 84 to depress the actuator of the valve 82 when engaged by the tire of the wheel. A ball 87 is rotatably mounted on the free end of the arm 84 and, as best shown in FIG. 3, engages the rim of the tire as the conveyor pulls the vehicle through the wheel washer assembly 10. Thus the wheel position sensing means 32 accurately senses the position of the wheel as it moves through the wheel washer assembly and controls the position of the brush holder assembly 18 to assure that the brush 28 and nozzles 30 are accurately aligned with the wheel. The arm 84 is spring-biased in the counterclockwise direction as viewed in FIG. 3 to maintain the valve 82 in its normally closed position whenever a tire is not in engagement with the ball 87.

When the wheel has been moved over the exit treadle the carriage 16 and brush holder assembly 18 are restored to their retracted positions until the next wheel enter the wheel washer assembly to repeat the cycle.

In FIG. 5 a stepped brush 28a is substituted for the brush 28. The stepped brush includes an elongate portion 96, extending approximately along three-quarters of the length of the brush, and a short portion 97. The short portion engages the approximate center of the hub cap, which on most vehicles protrudes laterally from the wheel, allowing the elongate portion to enter the normally recessed portion of the hub cap.

It is believed that the invention will have been clearly understood from the foregoing detailed description of my preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows:

1. A wheel washer comprising, means for moving a wheeled vehicle along a predetermined path; means for rotating a wheel of the vehicle as it is moved along said path; and means for scrubbing the tire and hub cap of said wheel as it is moved along said path, said scrubbing means including nozzles for applying hot soapy water or the like and at least two vertically spaced brushes, said two brushed including an upper brush moveable with the vehicle along said path and a lower brush fixed relative to the direction of said path.

2. The wheel washer defined by claim 1 further including means for moving said upper brush along said path, and actuating means engageable by said wheel for energizing said upper brush-moving means and deenergizing said upper brush-moving means when out of engagement with said wheel so that the position of said upper brush is determined by the position of said wheel.

3. A wheel washer comprising, means for moving a wheeled vehicle along a predetermined path; means for rotating a wheel of the vehicle as it is moved along said path; and means for scrubbing the tire and hub cap of said wheel a it is moved along said path, said means for rotating said wheel including a plurality of rotating rollers over which the wheel is conveyed; said means for scrubbing the wheel including a lower brush aligned with the tire of said wheel and fixed relative to the direction of said path, an upper brush aligned with a hub cap on said wheel and moveable along said path, a nozzle moveable along said path, and means for moving said upper brush and nozzle synchronously with said wheel.

4. The wheel washer of claim 1 wherein said upper brush is stepped having a reduced portion engageable with the approximate center of the vehicle wheel.

\* \* \* \* \*